US010085146B2

(12) United States Patent
Chen et al.

(10) Patent No.: US 10,085,146 B2
(45) Date of Patent: Sep. 25, 2018

(54) HANDLING INSTANT MESSAGE DELIVERY MEDIA TO END USER

(71) Applicant: International Business Machines Corporation, Armonk, NY (US)

(72) Inventors: Shu-chih Chen, New Taipei (TW); Jen-Ping Cheng, Taipei (TW); Wei-Te Chiang, Taipei (TW); Pei-yi Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 14/921,331

(22) Filed: Oct. 23, 2015

(65) Prior Publication Data

US 2016/0295402 A1 Oct. 6, 2016

Related U.S. Application Data

(63) Continuation of application No. 14/672,984, filed on Mar. 30, 2015.

(51) Int. Cl.
*H04W 12/02* (2009.01)
*H04W 4/12* (2009.01)
*H04L 12/58* (2006.01)
*H04W 4/02* (2018.01)

(52) U.S. Cl.
CPC .............. *H04W 12/02* (2013.01); *H04L 51/04* (2013.01); *H04L 51/12* (2013.01); *H04L 51/38* (2013.01); *H04W 4/02* (2013.01); *H04W 4/12* (2013.01); *H04L 51/24* (2013.01)

(58) Field of Classification Search
CPC ....... H04L 51/04; H04L 51/24; H04L 12/581; H04L 12/587
See application file for complete search history.

(56) References Cited

U.S. PATENT DOCUMENTS

| 6,714,791 | B2 | 3/2004 | Friedman |
| 7,219,303 | B2 | 5/2007 | Fish |
| 7,284,034 | B2 * | 10/2007 | Matsa ..................... H04L 12/24 |
| | | | 709/203 |

(Continued)

FOREIGN PATENT DOCUMENTS

| CN | 102722674 A | 10/2012 |
| WO | 2011064235 A1 | 6/2011 |

OTHER PUBLICATIONS

Loukas et al., "MILC: A secure and privacy-preserving mobile instant locator with chatting," Information Systems Frontiers, Jul. 2012, p. 481-497, vol. 14, Issue 3, Springer Science + Business Media.

(Continued)

*Primary Examiner* — Lashonda Jacobs
(74) *Attorney, Agent, or Firm* — Reza Sarbakhsh

(57) ABSTRACT

A method for handling a plurality of instant message delivery media to a user of a mobile device is provided. The method may include detecting at least one instant message to be delivered to a recipient-user on the mobile device. The method may also include determining if a plurality of predefined conditions have been configured by the recipient-user. The method may further include displaying the at least one instant message to the recipient-user in accordance with the plurality of predefined conditions configured by the recipient-user.

7 Claims, 8 Drawing Sheets

(56) References Cited

U.S. PATENT DOCUMENTS

| | | | | |
|---|---|---|---|---|
| 7,295,657 | B1* | 11/2007 | Keohane | H04L 12/581 370/352 |
| 7,502,831 | B1* | 3/2009 | Macias | H04L 51/04 370/360 |
| 7,509,384 | B1 | 3/2009 | Chen et al. | |
| 7,917,589 | B2 | 3/2011 | Kronlund et al. | |
| 7,949,107 | B2 | 5/2011 | Boss et al. | |
| 8,135,786 | B2* | 3/2012 | Supakkul | G06Q 10/107 709/206 |
| 8,386,568 | B2* | 2/2013 | Kaminsky | H04L 12/581 709/205 |
| 8,825,778 | B2 | 9/2014 | DeLuca et al. | |
| 9,047,472 | B2* | 6/2015 | Riordan | G06F 21/60 |
| 9,189,775 | B2* | 11/2015 | DeLuca | G06Q 10/107 |
| 9,203,791 | B1* | 12/2015 | Olomskiy | G06F 21/82 |
| 9,600,680 | B2* | 3/2017 | Rakshit | G06F 21/6218 |
| 9,922,202 | B2* | 3/2018 | Rakshit | G06F 21/6218 |
| 2002/0178227 | A1* | 11/2002 | Matsa | H04L 29/06 709/206 |
| 2004/0010808 | A1* | 1/2004 | deCarmo | H04L 51/04 725/139 |
| 2004/0019695 | A1* | 1/2004 | Fellenstein | G06Q 10/107 709/239 |
| 2004/0143632 | A1* | 7/2004 | McCarty | H04L 12/1813 709/206 |
| 2005/0055412 | A1* | 3/2005 | Kaminsky | H04L 51/04 709/207 |
| 2005/0058268 | A1* | 3/2005 | Koch | H04W 68/005 379/207.16 |
| 2006/0018447 | A1* | 1/2006 | Jacovi | H04L 12/581 379/88.17 |
| 2006/0161629 | A1* | 7/2006 | Cohen | G06F 21/84 709/206 |
| 2008/0052759 | A1* | 2/2008 | Kronlund | G06F 21/6209 726/2 |
| 2009/0055485 | A1 | 2/2009 | Tsai et al. | |
| 2009/0070881 | A1* | 3/2009 | Yellepeddy | G06F 21/6245 726/26 |
| 2009/0192970 | A1* | 7/2009 | O'Sullivan | G06F 17/211 706/48 |
| 2011/0148752 | A1* | 6/2011 | Alameh | G06F 1/1694 345/156 |
| 2013/0007153 | A1* | 1/2013 | Maynard | G06Q 10/107 709/206 |
| 2013/0110940 | A1* | 5/2013 | Pasquero | H04M 1/72552 709/206 |
| 2014/0150114 | A1* | 5/2014 | Sinha | G06F 21/62 726/28 |
| 2014/0208445 | A1* | 7/2014 | DeLuca | H04L 63/0428 726/30 |
| 2014/0256288 | A1 | 9/2014 | Allen | |
| 2015/0047048 | A1* | 2/2015 | Charugundla | H04L 65/60 726/26 |

OTHER PUBLICATIONS

Mell et al., "The NIST Definition of Cloud Computing," National Institute of Standards and Technology, Information Technology Laboratory, Oct. 7, 2009, Version 15.

Singh, "Use 'Hidden Mode' in Hike Messenger to Lock Chats with a Password," TechMesto, Sep. 9, 2014, p. 1-3, https://www.techmesto.com/hidden-mode-hike-messenger/, Accessed on Mar. 25, 2015.

IBM, "List of IBM Patents or Patent Applications Treated as Related (Appendix P)," Oct. 23, 2015, p. 1-2.

CHEN et al., "Handling Instant Message Delivery Media to End User," Application and Drawings, filed Mar. 30, 2015, 32 Pages, U.S. Appl. No. 14/672,984.

* cited by examiner

US 10,085,146 B2

HANDLING INSTANT MESSAGE DELIVERY MEDIA TO END USER

BACKGROUND

The present invention relates generally to the field of computers, and more particularly to the delivery of instant message media.

Today, users of instant messaging services often feel as though they have no privacy when using a mobile device in a public area, such as on a crowded train or a bus. For example, another passenger of the train or bus may watch a user's screen, especially when the user is using an instant messaging service to communicate with others.

SUMMARY

According to one embodiment, a method for handling a plurality of instant message delivery media to a user of a mobile device is provided. The method may include detecting at least one instant message to be delivered to a recipient-user on the mobile device. The method may also include determining if a plurality of predefined conditions have been configured by the recipient-user. The method may further include displaying the at least one instant message to the recipient-user in accordance with the plurality of predefined conditions configured by the recipient user.

According to another embodiment, a computer system for handling a plurality of instant message delivery media to a user of a mobile device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting at least one instant message to be delivered to a recipient-user on the mobile device. The method may also include determining if a plurality of predefined conditions have been configured by the recipient-user. The method may further include displaying the at least one instant message to the recipient-user in accordance with the plurality of predefined conditions configured by the recipient user.

According to yet another embodiment, a computer program product for handling a plurality of instant message delivery media to a user of a mobile device is provided. The computer program product may include one or more computer-readable storage devices and program instructions stored on at least one of the one or more tangible storage devices, the program instructions executable by a processor. The computer program product may include program instructions to detect at least one instant message to be delivered to a recipient-user on the mobile device. The computer program product may also include program instructions to determine if a plurality of predefined conditions have been configured by the recipient-user. The computer program product may further include program instructions to display the at least one instant message to the recipient-user in accordance with the plurality of predefined conditions configured by the recipient user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
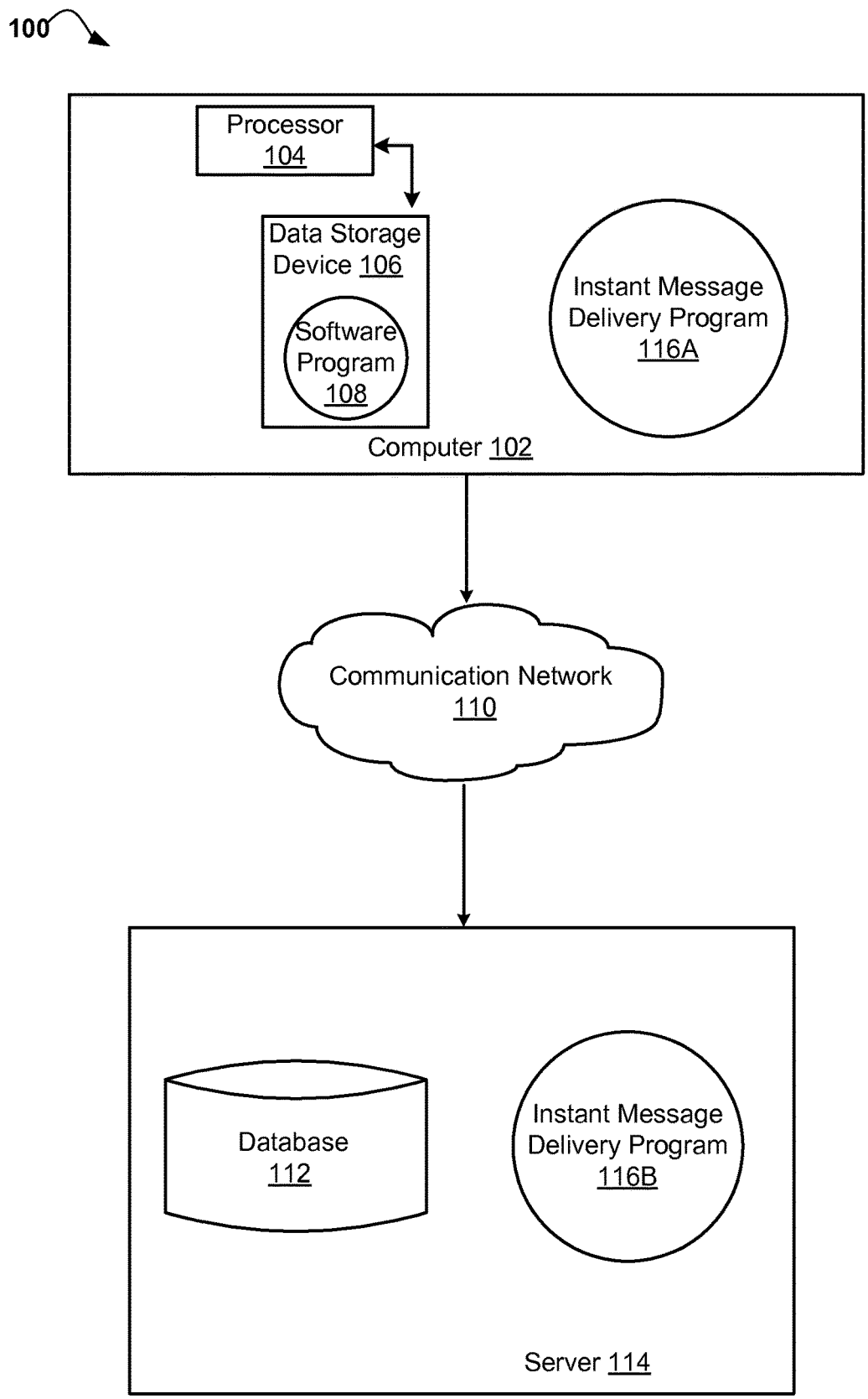
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to the delivery of instant message media (i.e., any media data associated with an online application). As such, the present embodiment relates to improving the delivery of instant message media to an end user. More specifically, the present embodiment may provide a method for displaying messages according to a set of conditions that are configured by the user receiving the instant message media. Therefore, the present embodiment has the capacity to improve the technical field of instant message media delivery by enabling a user to configure conditions to hide or unhide instant message media that is delivered to their mobile device, such as a smartphone.

As previously described, users of instant messaging services often feel as though they have no privacy when using a mobile device such as a smart phone, in a public area. This is especially frustrating if the content that the user is reading is confidential. Currently there is technology that may add a privacy screen protector on top of the mobile device, such as a smart phone screen. However, the privacy screen protector may be problematic since the screen protector is protecting the screen being viewed by different angels. Therefore, if the person who is watching the user's screen is standing right behind the user, he/she can still read the content that the user is reading on their mobile device. Additionally, when a user holds a smart phone sideways, the privacy screen protector will not work, as the design is only to protect the screen in one way. As such, it may be advantageous, among other things, to enable a user to configure conditions to hide or unhide instant message media that is delivered to their mobile device.

According to at least one implementation, the present embodiment may provide a method for displaying messages according to a set of conditions that are configured by the user. As such, the user can setup the conditions to hide the messages, and the posture of temporarily un-hiding the message. For example, the user can configure his/her device to display the new instant message only for three seconds and then hide the message. Hence, the user may not need to worry other people might read the delivered message clearly in a crowded space. Then after three seconds has elapsed, the message may become a bubble or some other symbol to prevent others from reading or viewing it. Additionally, the user may also configure the settings to apply to some contacts who may send confidential information to the user. Hence, the information from the specified contacts may be hidden in a specified number of seconds (i.e., a specified amount of time) until the receiver wants to review the information again.

After the messages are hidden, if the user wants to temporarily read the message, the user can un-hide the message by a predefined posture (i.e., performing a trigger event), such as pressing the message for a certain period of time, or sweeping on a sensor (which may be located on the back of the device, for example). Significantly, the present embodiment is configured by the receiver, not the sender of the message.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to handle the delivery of online media to an end user. As previously described, other possible solutions for privacy may include attaching a privacy screen protector. Attaching the privacy screen may prevent exposing the messages, however, if some people are just in the right angle, they can stare at the device for long time and catch the information. Unlike such a workaround of attaching a privacy screen protector which still exposes information in a range of angels, the present embodiment may apply the preconfigured conditions selected by the user.

Another current possible solution may be to categorize the messages according to a confidential category selected by the sender. However, such a solution depends on the message sender who decides how he/she sends out the messages and then it requires the user to setup the messages one by one.

According to at least one implementation, the present embodiment is designed from the receiver's point of view and therefore, may provide a pleasant and secure experience for the user to check messages or data on their mobile device. Additionally, the present embodiment may provide a universal configuration that applies the conditions which were configured by the user. As such, the user can decide how and he/she wants to check the messages actively (i.e., hiding or unhiding delivered messages).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an Instant Message Delivery Program 116A. The networked computer environment 100 may also include a server 114 that is enabled to run an Instant Message Delivery Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Instant Message Delivery Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Instant Message Delivery Program 116A, 116B may interact with a database 112 that may be embedded in various storage devices, such as, but not limited to a computer/mobile device 102, a networked server 114, or a cloud storage service. According to at least one implementation, the database 112 may store the pre-configured conditions created by the user.

As previously described, the client computer 102 may access the Instant Message Delivery Program 116B, running on server computer 114 via the communications network 110. For example, a user using a client computer 102 may use the Instant Message Delivery Program 116A, 116B to handle instant message delivery media. As such, the Instant Message Delivery Program 116A, 116B, may enable a user to configure conditions to hide or unhide instant message media that is delivered to their mobile device. The Instant Message Delivery method is explained in more detail below with respect to FIG. 2A-2D.

Referring now to FIG. 2A-2D, an operational flowchart 200 illustrating the steps carried out by a program to handle instant message delivery media.

Figure 2A:
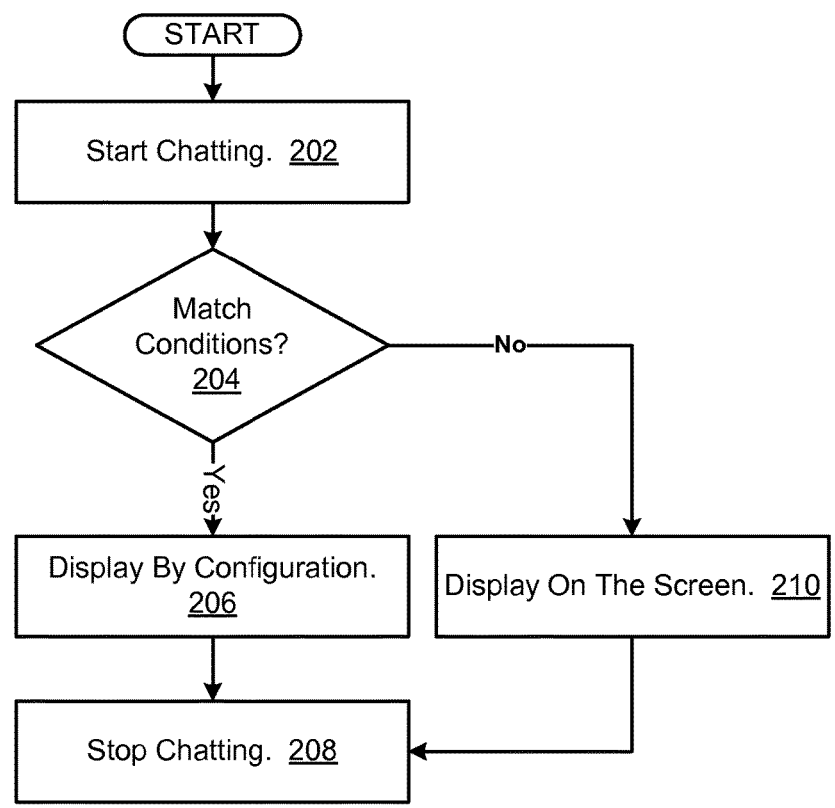
FIG. 2A-2D is an operational flowchart illustrating the steps carried out by a program that handles instant message delivery media to an end user.

FIG. 2A illustrates an application usage flow that depicts the mechanism of the Instant Message Delivery Program 116A, 116B (FIG. 1) that displays messages according to the pre-defined conditions set by a user. Therefore, with respect to FIG. 2A at 202, an instant message chat may begin between at least two users. Then at 204, it is determined whether the conditions assigned by the user are matched based on the current chat. As previously explained, a user may setup conditions to hide messages as well as unhide messages. For example, the user may configure his/her device to display the new instant message only for three seconds and then hide the message. Hence, the user doesn't need to worry other people might read it clearly in a crowded space. After a predefined threshold is met, such as three seconds, the message may become, for example, a bubble or some other symbol to prevent others from viewing it.

If at 204 it is determined that the preconfigured conditions of the user are matched, then at 206, the message is displayed according to those conditions. For example, a pre-configured condition may have been created so that all messages from a particular person are displayed for only 3 seconds. Therefore, if the Instant Message Delivery Program 116A, 116B (FIG. 1) determines that the message being delivered is from a person that has been identified in the set of pre-configured conditions as one whose messages should be hidden, then the Instant Message Delivery Program 116A, 116B (FIG. 1) will display the delivered message to the end user according to that preconfigured condition. Then at 208, the chat may end. However, if at 204 it is determined that the preconfigured conditions of the user are not matched, then at 210, the message is displayed normally in the user's screen.

Figure 2B:
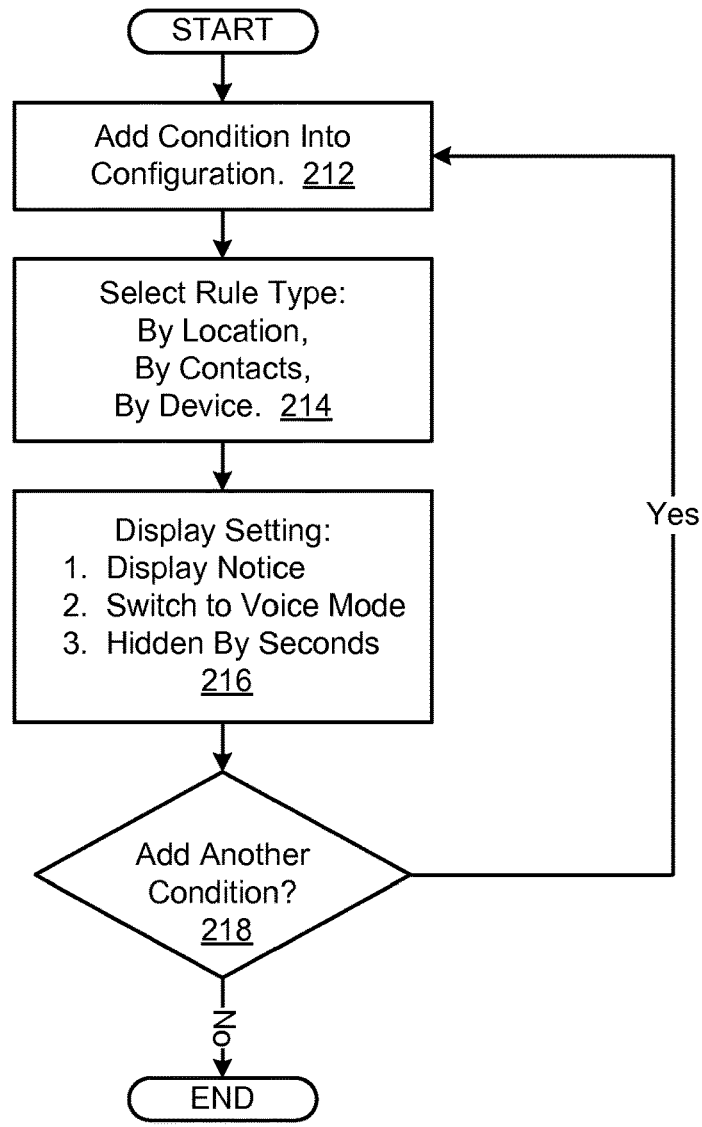

FIG. 2B illustrates a configure flow that depicts the process for setting rules of the configuration. Such rules may include displaying messages according to the user's location (e.g., at home, or office), or by contacts. According to various implementations, the present embodiment may display the message according to specified configurations as follows: show the message notice in the screen or not; transform the text message into voice; or hide the messages in the specified seconds. These preconfigured conditions may be stored in a repository, such as a database 112 (FIG. 1).

Therefore with respect to FIG. 2B at 212, a condition is added into the configuration repository. For example, the user can setup the conditions to hide the messages, and the posture of temporarily un-hiding the message. According to at least one implementation, the user may be prompted with a graphical user interface (GUI) to assist with the creation of the pre-configured conditions.

Therefore at 214, the rule type is selected by the user. For example, the rule type may be by location, by contacts, by device, or by other criteria. For example, all messages from a particular contact may be hidden or all messages may be hidden when the user is at a particular location; when the message is sent by a particular contact or group of contacts; when the message was sent from a particular device, an unidentified device, or any other criteria created by the user.

Then at 216, the settings are displayed. According to at least one implementation, the user may select from the following display settings: display notice; switch to voice mode; or hidden by seconds. Next at 218, the user may be prompted to add another condition and if the user decides to add another condition, then the method may return to step 212. Otherwise, the method may end.

As previously described, the user can configure his/her device to display the new instant message only for three seconds then hide it. Hence, the user may not need to worry other people might read it clearly in a crowded space. Then after three seconds has elapsed, the message may become a bubble or some other symbol to prevent others from reading or viewing it. Additionally, the user may also configure the settings to apply to some contacts who may send confidential information to the user. Hence, the information from the specified contacts may be hidden in the specified seconds until the receiver wants to review the information again.

After the messages are hidden, if the user want to temporarily read the message, the user can un-hide the message by a predefined posture (i.e., performing a trigger event), such as pressing the message for a certain period of time, or sweeping on a sensor.

Figure 2C:
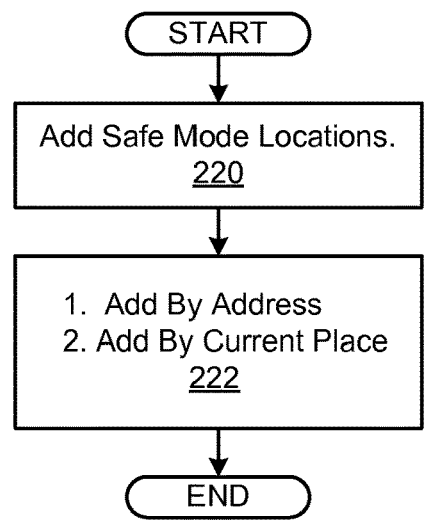

FIG. 2C illustrates the configure location flow that depicts how the rule "by location" may be used to add the safe locations. As such, when the users are in the safe areas, the messages may be displayed in a normal way. However, when the user travels to undefined locations, the messages may be displayed in the way that the user configured. For example, the message may show the notification, or hide the message in 3 seconds.

Therefore, with respect to FIG. 2C at 220, the user can add more safe mode locations. Then at 222, the user can add them by address or by current place. As previously described, a GUI may be used to assist the user in the creation and editing of the pre-defined configuration settings.

Figure 2D:
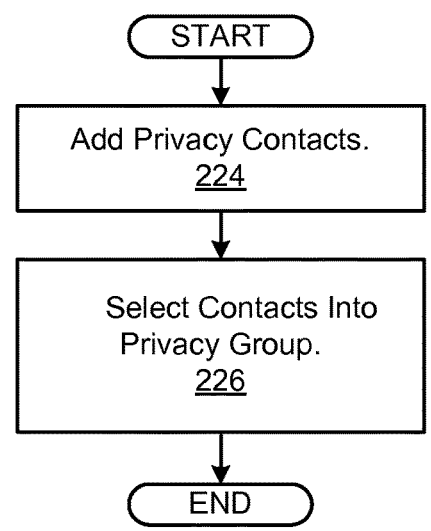

FIG. 2D illustrates the configure contact flow that depicts how the rule of "by contacts" may be used to identify the contacts who may send confidential information frequently. As such, the messages from these contacts may be displayed as the configured way which the receiver feels comfortable and secured.

Therefore at 224, the user can add privacy contacts. Then at 226, the user can select the contacts into privacy groups so that the messages from these contacts may be displayed as the configured way which the receiver feels comfortable and secured. For example, the user may wish to hide all messages from a particular group or contact until a trigger event occurs that will unhide the message. An example, of a trigger event may be the user pressing the hidden message for a certain period of time before it is unhidden and displayed to the user.

It may be appreciated that FIGS. 2A-2D provide only an illustration of one implementation and does not imply any limitations with regard to how different embodiments may be implemented. Many modifications to the depicted environments may be made based on design and implementation requirements. According to the present embodiment, through defining the policy (i.e., the pre-configured conditions), the message receiver has the capability to prevent others spying on the information on the device. For example, the user can decrease the visibility of messages when the location is considered as less private, or when the messages are coming from the sensitive contact or device which is not identified previously. In the lower secure conditions, the user still has the capability to bring the specified message back easily with the predefined posture so it is not burdensome to the message receiver to increase the security. Location, contact or device contexts are examples of device behavior that can be modified. As such, the present embodiment generally relates to protecting instant messages with given policies to provide secure as well as desirable user experiences.

Additionally, the user can also set up the method to apply to some contacts who may send confidential information to the user. Hence, the information from the specified contacts may be hidden in the specified seconds until the receiver wants to review the information again. After the messages are hidden, if the user want to temporarily read the message, the user can simply un-hide the message by a predefined posture (i.e., performing a trigger event), such as pressing the message for a certain period of time, or sweeping on a sensor.

Since the present embodiment is designed from the "receiver's point of view", it may provide a pleasant and secure experience for checking messages. Furthermore, the present embodiment may provide a universal configuration that applies the conditions. Significantly, the user may decide how and he/she wants to check the message actively.

Figure 3:
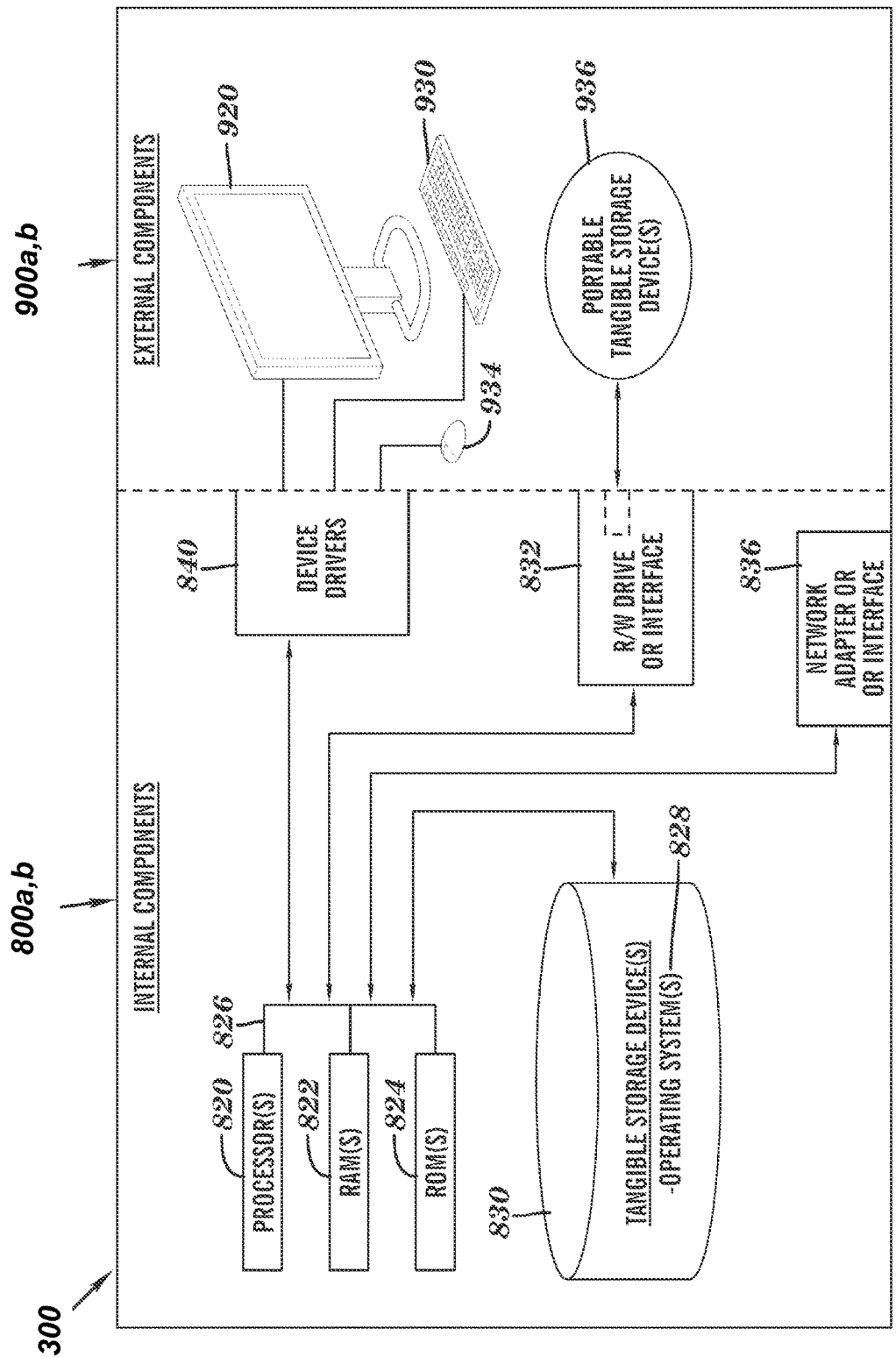
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Instant Message Delivery Program 116A (FIG. 1) in client computer 102 (FIG. 1) and the Instant Message Delivery Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Instant Message Delivery Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Instant Message Delivery Program 116A (FIG. 1) in client computer 102 (FIG. 1) and the Instant Message Delivery Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Instant Message Delivery Program 116A (FIG. 1) in client computer 102 (FIG. 1) and the Instant Message Delivery Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
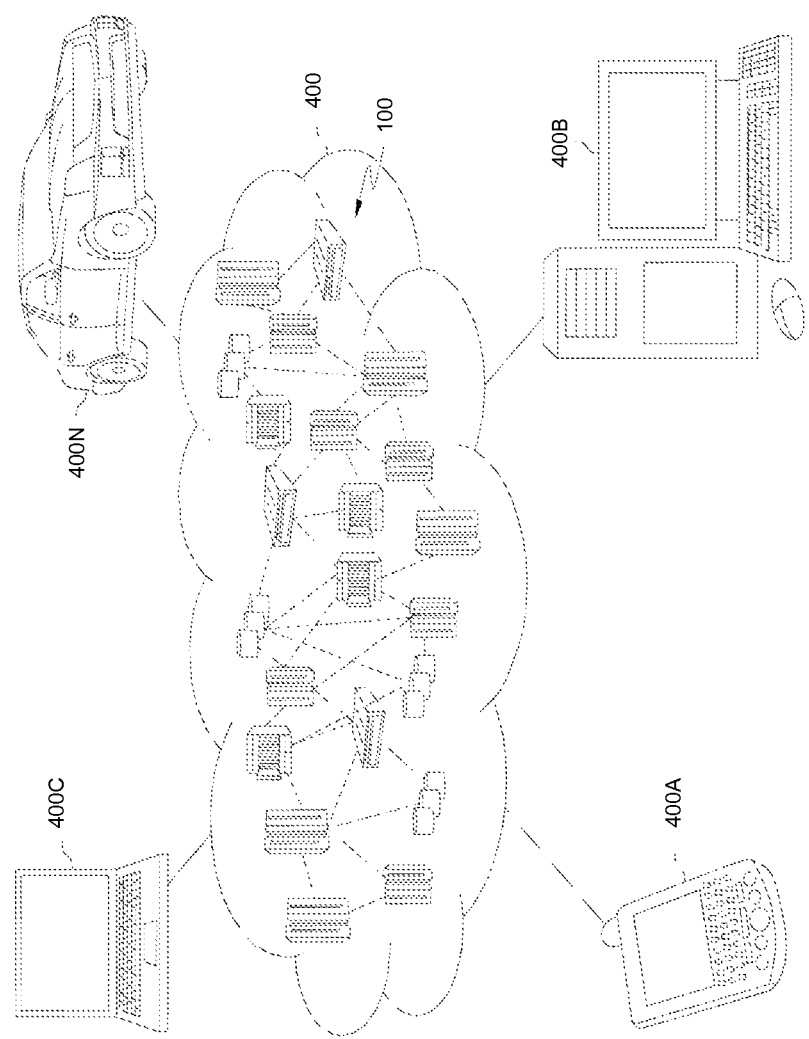
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
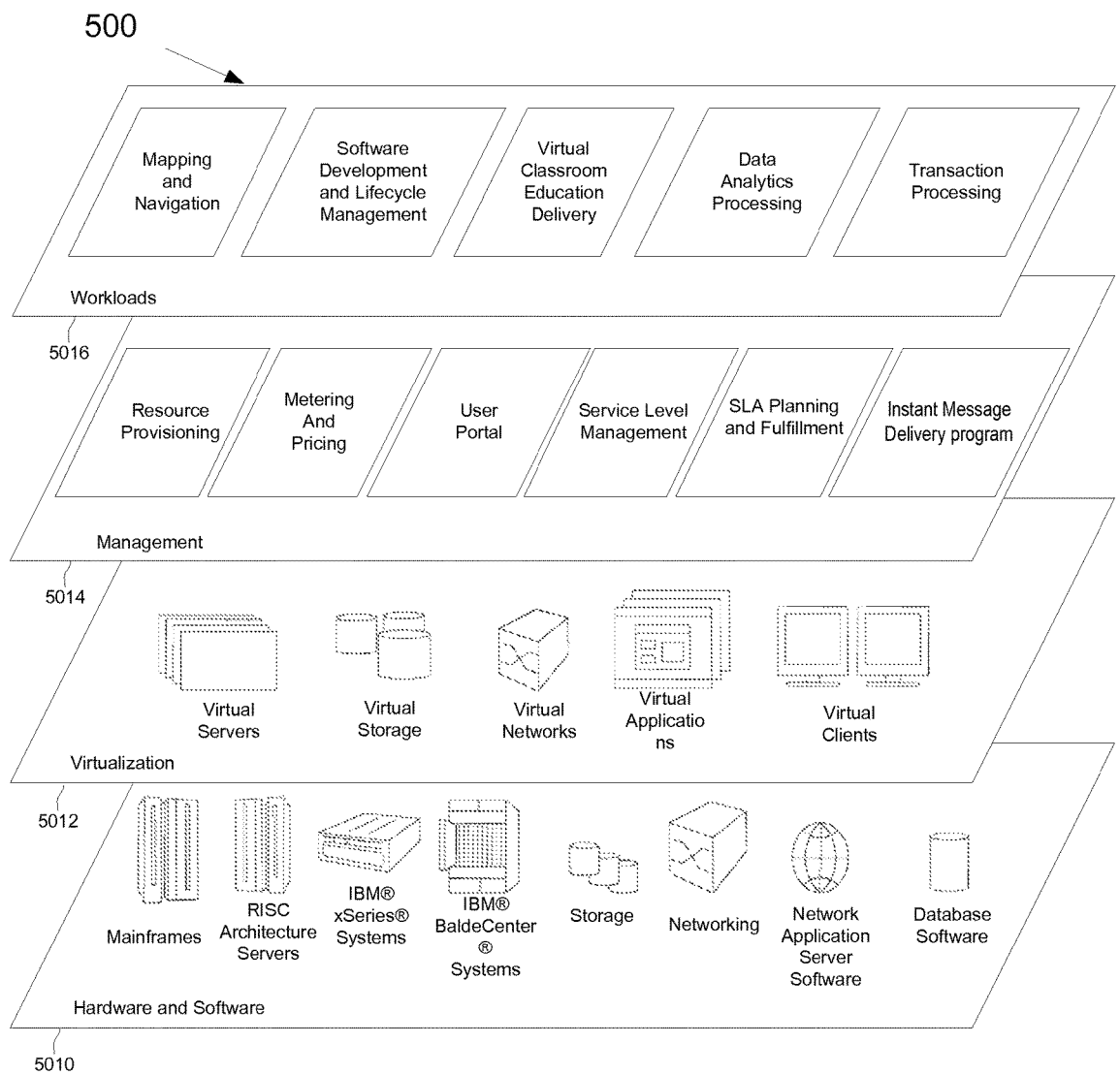
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. An Instant Message Delivery Program may enable an end user to configure conditions to hide or unhide instant message media that is delivered to their mobile device.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for handling a plurality of instant message delivery media to a user of a mobile device, the method comprising:
  detecting at least one instant message to be delivered to a recipient-user on the mobile device, wherein the at least one instant message comprises confidential information as defined by the recipient user;
  determining if a plurality of predefined instant message display conditions have been configured by the recipient-user;

displaying the at least one instant message to the recipient-user in accordance with the plurality of predefined instant message display conditions configured by the recipient-user; and in response to a trigger event by the recipient-user, overriding the plurality of pre-defined instant message display conditions to temporarily re-display the at least one instant message to the recipient-user, wherein the trigger event is detected when the recipient-user activates a sensor located on the mobile device, and wherein temporarily re-displaying the at least one instant message to the recipient-user comprises unhiding the at least one instant message for a pre-determined amount of time.

2. The method of claim 1, wherein the plurality of predefined instant message display conditions is configured by the recipient-user who is a receiver of the at least one instant message.

3. The method of claim 1, further comprising:

applying the plurality of predefined instant message display conditions to a plurality of contacts associated with at least one sender-user who sends a plurality of confidential information to the recipient-user;

hiding the plurality of confidential information after the plurality of confidential information has been displayed for a specified period of time to the recipient-user; and re-displaying the plurality of confidential information to the recipient-user after detecting a trigger event by the recipient-user.

4. The method of claim 3, wherein the trigger event is detected when the recipient-user performs a specific action.

5. The method of claim 2, wherein the plurality of predefined instant message display conditions is configured by a defining policy that defines how to deliver the at least one instant message to the recipient-user on the mobile device.

6. The method of claim 3, wherein the defining policy decreases a visibility associated with the displaying of the at least one instant message to the recipient-user.

7. The method of claim 6, wherein the recipient-user can decrease the visibility of messages when the location is considered as less private, when the at least one instant message is coming from a sensitive contact, the at least one instant message is coming from a specific device, or the at least one instant message is coming from a device which has not been previously identified.

* * * * *